May 19, 1953 A. J. GROSS 2,638,797
AXLE AND DIFFERENTIAL LOCK
Filed Aug. 8, 1951 2 Sheets-Sheet 1

INVENTOR.
ADOLPH J. GROSS
BY
Harry N. Hitzeman
ATTORNEY

May 19, 1953  A. J. GROSS  2,638,797
AXLE AND DIFFERENTIAL LOCK
Filed Aug. 8, 1951  2 Sheets-Sheet 2
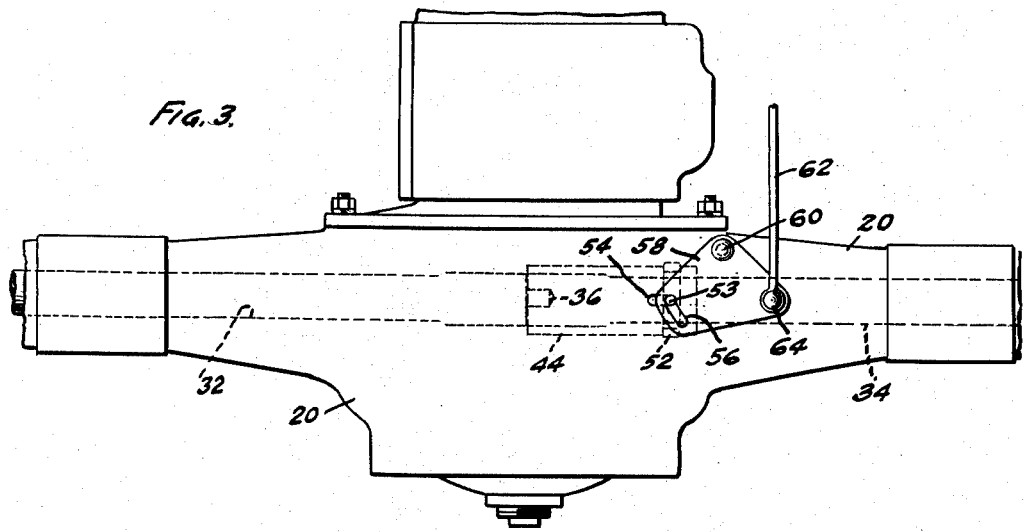
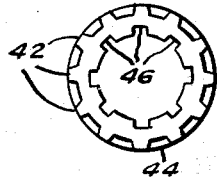
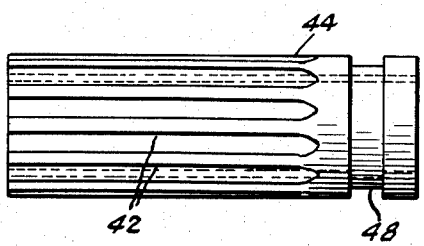
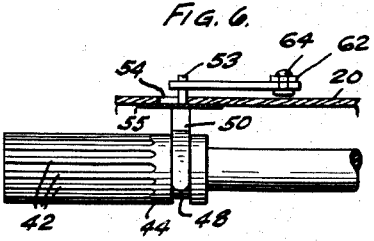
INVENTOR.
ADOLPH J. GROSS
BY
Harry W. Hitzeman
ATTORNEY.

Patented May 19, 1953

2,638,797

UNITED STATES PATENT OFFICE 2,638,797

AXLE AND DIFFERENTIAL LOCK

Adolph J. Gross, Chicago, Ill.

Application August 8, 1951, Serial No. 240,923

1 Claim. (Cl. 74—710.5)

My invention relates to mechanism for optionally locking together the axles of an automotive vehicle.

My invention relates more particularly to mechanism for locking together two axles of a vehicle which are driven from the source of power by means of a drive shaft and differential.

Devices of this type have been suggested at various times, but most of the devices of the prior art are impractical usually for the reason that they do not conform to nor are they adaptable for use with the general standard designs of differentials and rear axles as presently constructed and used upon passenger cars and trucks today.

The principal object of the present invention is to provide an improved axle and differential locking means capable of adaptation to various standard constructions of differentials and rear axles as used in automotive vehicles today.

A further object of the invention is to provide mechanism of the type described for optionally locking together the aligned rear axles of an automotive vehicle, the mechanism being such that it may be either manually or pedally operated from the driving seat of the automotive vehicle.

It is a well known fact that with present day construction of automobiles and the universal application of differentials in connection with the drive to the rear wheels, that when one wheel is stationary in mud, snow or sand, or when an axle key strips or an axle breaks, the power which is applied through the differential is directed solely to the wheel which encounters the least resistance. Thus, for example, when a vehicle is parked adjacent a curb with one of the rear wheels on ice, in mud, sand or snow, the power is applied to drive the vehicle away and the wheel which is stationed in the snow, sand or mud, or on the ice, will turn more freely than the other wheel, and as a result the wheel mentioned will rotate freely while the other wheel remains stationary, thus making it impossible to drive away from the position occupied with the normal power of the vehicle.

The present invention is directed to a comparatively simple construction of differential or axle lock capable of easy application to present differential and rear axle assembly constructions.

For a more complete understanding of the invention, and the advantages thereof, reference is had to the accompanying two sheets of drawings, upon which Fig. 1 is a fragmentary plan view partially in cross section, of a portion of the rear axles, the differential and the attachment for connecting to the drive shaft of an automotive vehicle;

Fig. 3 is a fragmentary plan view of a portion of the differential and rear axle assemblies showing the operating lever and associated parts for moving the locking sleeve member;

Fig. 4 is a front elevational view of the sleeve member;

Fig. 5 is a side elevational view of the same; and

Fig. 6 is a vertical sectional view through the axle housing and associated parts showing the operating connection between the rod and the sleeve actuating collar.

Figure 1:
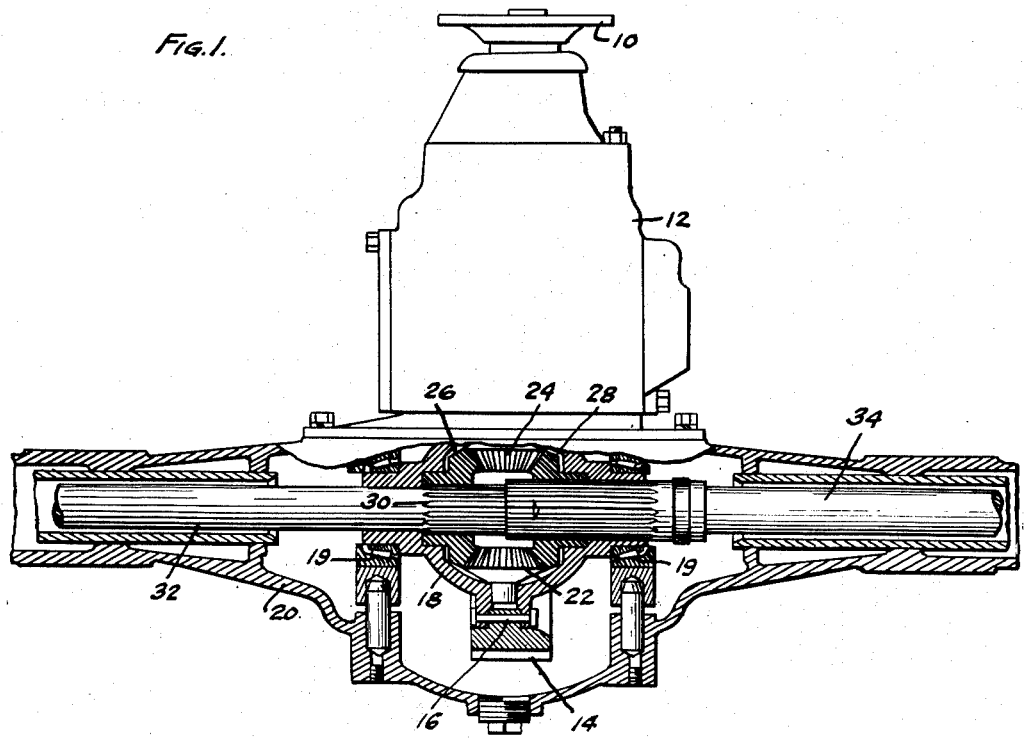

In the embodiment of the invention which I have chosen to illustrate and describe the same, I have shown a typical rear end differential and drive assembly of the type used for heavy duty on trucks. This may include a coupling member 10 which is connected in a suitable manner to the drive shaft of the vehicle, and by suitable gearing inside of the front differential housing 12 a drive is effected through a worm gear to the worm gear 14. The worm gear 14 is fastened by means of pin members 16 to the inner differential housing 18 which is mounted for rotation in suitable bearings 19 in the rear axle housing 20. Within the housing 18 a pair of pinions 22 and 24 normally engage bevel gears 26 and 28 which are mounted upon splines 30 on the ends of the two rear axles 32 and 34 respectively.

In the construction which I employ, the bevel gear 26 engages the splines 30 of the axle 32. It will be noted that the axles 32 and 34 are aligned and butt together at their inner ends, the axle 32 in addition carrying a medial pin 36 which engages a medial bore 38 in the axle 34.

The bevel gear 28, instead of being in driving engagement with the splines 35 of the axle 34, has its hub bored out slightly larger and provided with slots 40 which engage splines 42 on a sleeve member 44 which is telescopically mounted on the axle 34. The sleeve 44, in its normal or inoperative position, extends inwardly to a point adjacent the butting edges of the two axles 32 and 34, and has splines 42 therein extending a short distance beyond the edge of the hub 41 of the bevel gear 28.

The sleeve 44, as best shown in Figs. 4 and 5, is provided with the external splines 42 and also with internally disposed serrations 46 to receive the splines 35 of the axle 34. A reduced collar 48 is provided adjacent one end to receive the arms 50 of a yoke member 52 by means of which the sleeve can be moved back and forth on the axle 34 and engaging the slots or serrations 40 in the hub of the bevel gear 28.

A pin 53 may extend upwardly from the yoke 52 through an elongated slot 54 in the top of the differential housing 20. A thin plate member 55 may be provided within the housing 20 underlying the elongated opening 54 to prevent lubricant from escaping through the elongated hole 54. The pin may be engaged in a cam slot 56 in a plate 58 pivoted at 60 on the housing 20. An operating lever 62 may be pivotally connected at 64 to the plate 58. The rod 62 may extend forward to a point adjacent the driver's seat where it may be operated back and forth by means of a hand lever or foot pedal in any well known manner.

Figure 2:
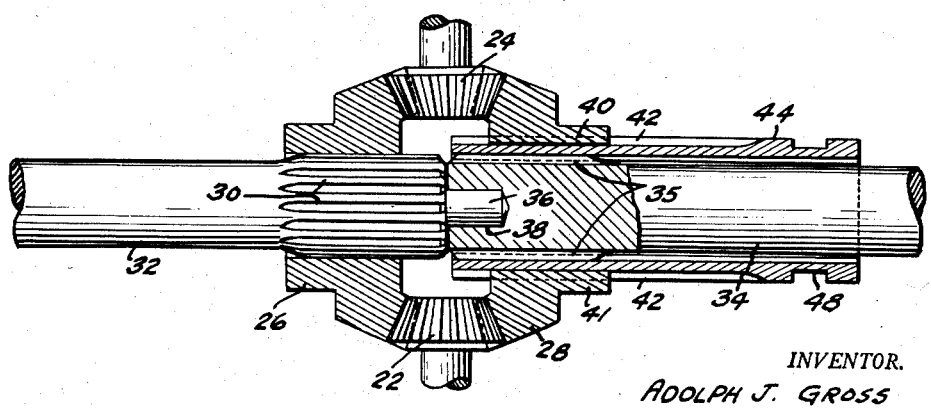
Fig. 2 is an enlarged fragmentary cross-sectional view of portions of the differential, rear axles and the locking sleeve which I employ.

During normal driving of the vehicle the sleeve 44 will be in the position shown in Figs. 1 and 2, forming a driving connection between the axle 34 and the bevel gear 28. When a situation arises where it is desired to lock the axles together so that equal traction will be applied to both wheels, the lever 62 is moved to swing the plate 58 clockwise about the pivot 60. This will move the operating pin 53 forward in the elongated slot 54, moving the sleeve 44 forward to engage the splines of the shaft 32, thus locking the two shafts together so that power applied through the differential gearing will be applied to both axles equally, and the wheels connected to the axles will both be rotated at the same rate of speed. In this condition it is of course easy to move a vehicle where one wheel is on ice, snow or other slippery substance, since both wheels will be turned together and the wheel that rests upon normal surface will have sufficient power applied to move the vehicle forward.

From the above and foregoing description, it can be seen that with the construction I have provided, that is the sleeve 44 and its position in connection with the axles and the differential gears, my construction may be applied to standard equipment by the simple expedient of broaching one of the bevel gears of the differential and telescoping the sleeve over the axle to form a driving connection therethrough.

Thus, with my construction, a differential and axle lock is capable of installation on present day equipment without modification of the same. The operating lever and associated parts may of course be as shown or in any other construction whereby a small forward and back movement of the sleeve can be effected.

While I have illustrated and described a specific embodiment of the invention, it will be clear to those skilled in the art that changes and modifications may be made in the exact details shown, and I do not wish to be limited in any particular; rather what I desire to secure and protect by Letters Patent of the United States is:

Apparatus for locking both rear axles of an automotive vehicle together for driving of both wheels at the same rate of speed, which comprises in combination with a differential having a pair of bevel gears of the same size, one of said bevel gears having an enlarged internal spline construction, a pair of identical aligned axles of ordinary construction including abutting splined ends extending through said bevel gears and driven by the differential, a thin sleeve member telescopically mounted on one of said splined axles capable of movement to encompass the splined end of the other axle thereby locking both axles into a single driven medium, said sleeve member having serrations of the same size throughout its length to receive the splines of the aligned axles, and serrations part way on its periphery to drivingly engage in the enlarged internal spline construction in the bore of the bevel gear of the differential through which it is telescoped, and means connected to said sleeve member for effecting reciprocal movement of the same.

ADOLPH J. GROSS.

References Cited in the file of this patent
UNITED STATES PATENTS

| Number | Name | Date |
|---|---|---|
| 1,142,831 | Miller | June 15, 1915 |
| 1,145,295 | DeWitt | July 6, 1915 |
| 1,338,720 | Darr | May 4, 1920 |
| 1,440,341 | Crispen | Dec. 26, 1922 |
| 1,511,908 | Pickering | Oct. 14, 1924 |
| 1,515,100 | Foster | Nov. 11, 1924 |
| 1,631,837 | Stone | June 7, 1927 |
| 1,680,134 | Dennison | Aug. 7, 1928 |
| 1,985,014 | Bush | Dec. 18, 1934 |
| 2,138,028 | Dooley | Nov. 29, 1938 |